US011209918B2

(12) United States Patent
Nicholson et al.

(10) Patent No.: US 11,209,918 B2
(45) Date of Patent: Dec. 28, 2021

(54) MEASURING LIGHT USING A DIGITAL PEN

(71) Applicant: LENOVO (Singapore) PTE. LTD., New Tech Park (SG)

(72) Inventors: John Weldon Nicholson, Cary, NC (US); Howard Locker, Cary, NC (US); Daryl C. Cromer, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 51 days.

(21) Appl. No.: 16/667,610

(22) Filed: Oct. 29, 2019

(65) Prior Publication Data

US 2021/0124432 A1 Apr. 29, 2021

(51) Int. Cl.
*G06F 3/038* (2013.01)
*G01J 3/50* (2006.01)
*G01J 1/42* (2006.01)
*G06F 3/0354* (2013.01)

(52) U.S. Cl.
CPC .......... *G06F 3/0386* (2013.01); *G01J 1/4204* (2013.01); *G01J 3/50* (2013.01); *G06F 3/03542* (2013.01)

(58) Field of Classification Search
CPC ...... G06F 3/0386; G06F 3/03542; G01J 3/50; G01J 1/4204
See application file for complete search history.

(56) References Cited

U.S. PATENT DOCUMENTS

| | | | |
|---|---|---|---|
| 2004/0140965 A1* | 7/2004 | Wang | G06F 3/0321 345/179 |
| 2008/0165163 A1* | 7/2008 | Bathiche | G06F 3/03545 345/179 |
| 2014/0253468 A1* | 9/2014 | Havilio | G06F 3/03545 345/173 |
| 2014/0347328 A1* | 11/2014 | Edgecomb | G06F 3/04883 345/179 |
| 2016/0048221 A1* | 2/2016 | Boulanger | G06F 3/041 345/594 |
| 2017/0068339 A1* | 3/2017 | Zimmerman | G06F 3/0416 |
| 2018/0157347 A1* | 6/2018 | Keidar | G06F 3/0386 |
| 2020/0225778 A1* | 7/2020 | Lewty | G06F 3/03545 |

* cited by examiner

*Primary Examiner* — Carolyn R Edwards
(74) *Attorney, Agent, or Firm* — Kunzler Bean & Adamson

(57) ABSTRACT

Apparatuses, methods, systems, and program products are disclosed for measuring light using a digital pen. An apparatus includes a processor and a memory that stores code executable by the processor. In one embodiment, the processor determines whether a digital pen that is configured to communicate with an information handling device is in a docked position. The processor receives a light measurement sensed by the digital pen and performs an adjustment to an output parameter of a display for the information handling device in response to receiving the light measurement. A method, system, and computer program product may perform the functions of the apparatus.

20 Claims, 7 Drawing Sheets

MEASURING LIGHT USING A DIGITAL PEN

FIELD

The subject matter disclosed herein relates to calibrating display color and more particularly relates to measuring light using a digital pen.

BACKGROUND

Some information handling devices such as a laptop or a smartphone include a camera or a light sensor that can detect whether an environment is dark enough to turn on a keyboard backlight or brighten a display screen. However, many information handling devices do not include any type of light sensor or include a light sensor with limited capabilities.

BRIEF SUMMARY

Apparatuses, methods, systems, and program products are disclosed for measuring light using a digital pen. An apparatus, in one embodiment, includes a processor, and a memory that stores code executable by the processor. In various embodiments, the code is executable to determine whether a digital pen that is configured to communicate with an information handling device is in a docked position. In certain embodiments, the processor is configured to receive a light measurement sensed by the digital pen and to perform an adjustment to a light output parameter of the information handling device in response to receiving the light measurement.

A method for measuring light using a digital pen includes, in one embodiment, determining, by use of a processor, whether a digital pen that is configured to communicate with an information handling device is in a docked position. In some embodiments, the method includes receiving a light measurement sensed by the digital pen and performing an adjustment to a light output parameter of the information handling device in response to receiving the light measurement.

An apparatus, in another embodiment, includes a digital pen in data communication with an information handling device. In various embodiments, the digital pen has a pointed tip portion configured to perform one or more functions of a first group of functions for interacting with a display of the information handling device and a blunt end opposite the pointed tip portion and configured to perform one or more functions of a second group of functions for interacting with the display of the information handling device. In some embodiments, the apparatus includes a light sensor disposed at the blunt end configured to perform at least one light measurement selected from an ambient light measurement, a focused light measurement, and combinations thereof, based at least in part on whether the digital pen is in a docked position relative to the information handling device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which.

DETAILED DESCRIPTION

Figure 1:
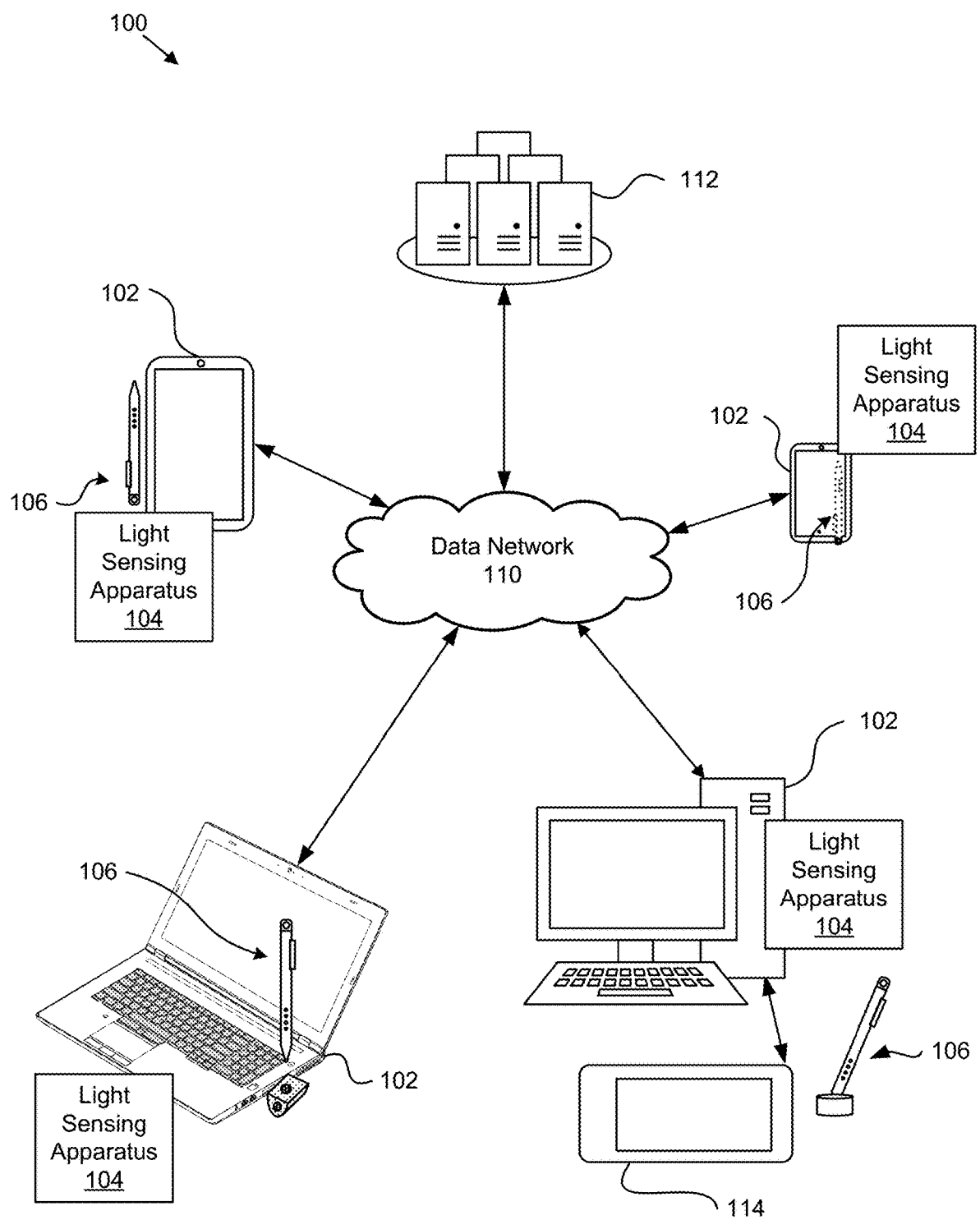
FIG. 1 is a schematic block diagram illustrating one embodiment of a system for measuring light using a digital pen.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine-readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field-programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together. Likewise, as used herein, the phrase "at least one" or "at least one of" indicates embodiments of one or more of the listed elements, with "at least one of A and B" indicating embodiments of element A alone, element B alone, or elements A and B taken together. In other words, with respect to listed elements, the terms "and/or", "at least one", and "at least one of" indicate embodiments of any of the listed elements alone as well as embodiments with any combination of the listed elements.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor to determine whether a digital pen that is configured to communicate with an information handling device is in a docked position. In the embodiment, the processor is configured to receive a light measurement sensed by the digital pen and to perform an adjustment to a light output parameter of the information handling device in response to receiving the light measurement. In some embodiments, in the docked position, the digital pen is configured to be disposed in a predetermined orientation for sensing ambient light.

In various embodiments, the processor is configured to use the light measurement as an ambient light measurement in response to determining that the digital pen is the docked position. In certain embodiments, the ambient light measurement includes at least one measurement selected from a brightness measurement, a color measurement, and combinations thereof. In one embodiment, in response to detecting a change in the brightness measurement of the ambient light measurement, the processor performs a brightness adjustment to at least a portion of the information handling device. In some embodiments, performing the adjustment to the output parameter of the display comprises adjusting a color temperature of the display for the information handling device based on the color temperature measurement received from the digital pen.

In certain embodiments, in response to detecting a change in the color temperature measurement of the ambient light measurement, the processor performs a corresponding adjustment to the color temperature of the display for the information handling device. In some embodiments, the processor is configured to use the light measurement as an ambient light measurement in response to determining that the digital pen is not in the docked position and determining that the digital pen is configured to be in an ambient light-sensing mode.

In some embodiments, the processor is configured to use the light measurement to select a drawing color for the digital pen in response to determining that the digital pen is not in the docked position and determining that the digital pen is configured to be in a color selection mode. In various embodiments, the drawing color selected is a color emitted by a portion of a display for the information handling device.

In certain embodiments, the drawing color selected is a reflected color sensed by the digital pen from an object in ambient light.

A method for measuring light using a digital pen includes, in one embodiment, determining whether the digital pen that is configured to communicate with an information handling device is in a docked position. In some embodiments, the method includes receiving a light measurement sensed by the digital pen and performing an adjustment to a light output parameter of the information handling device in response to receiving the light measurement.

In various embodiments, the method includes using the light measurement as an ambient light measurement that includes at least one measurement selected from a brightness measurement, a color measurement, and combinations thereof. In some embodiments, the method includes, in response to detecting a change in the brightness measurement of the ambient light measurement, performing a brightness adjustment selected from a display adjustment, a keyboard backlight adjustment, and combinations thereof. In certain embodiments, performing the adjustment to the light output parameter of the information handling device includes adjusting a color temperature of a display for the information handling device based on the color temperature measurement received from the digital pen.

In some embodiments, in response to detecting a change in the color temperature measurement of the ambient light measurement, performing a corresponding adjustment to a color temperature of the display for the information handling device. In various embodiments, the method includes using the light measurement to select a drawing color for the digital pen in response to determining that the digital pen is not in the docked position and determining that the digital pen is configured to be in a color selection mode.

Another apparatus for measuring light using a digital pen includes a digital pen in data communication with an information handling device. In the embodiment, the digital pen has a pointed tip portion configured to perform one or more functions of a first group of functions for interacting with a display of the information handling device and a blunt end opposite the pointed tip portion and configured to perform one or more functions of a second group of functions for interacting with the display of the information handling device. In various embodiments, the apparatus includes a light sensor disposed at the blunt end configured to perform at least one light measurement selected from an ambient light measurement, a focused light measurement, and combinations thereof, based at least in part on whether the digital pen is in a docked position relative to the information handling device.

In various embodiments, the digital pen is configured to perform the one or more functions of the second group using the light sensor disposed at the blunt end. In certain embodiments, the first group of functions includes narrow width drawing functions, pointing functions, object selection functions, command functions and so forth, and the second group of functions includes display brightness adjustment functions, display color temperature adjustment functions, erasing functions, drawing color selection functions, marking functions, and so forth.

FIG. 1 is a schematic block diagram illustrating one embodiment of a system 100 for measuring light using a digital pen 106. In various embodiment, the system 100 includes one or more information handling devices 102, one or more light-sensing apparatuses 104, one or more digital pens 106, one or more light sensor 108, one or more data networks 110, one or more servers 112, and one or more digitizing tablets 114. In certain embodiments, even though a specific number of information handling devices 102, light-sensing apparatuses 104, digital pens 106, light sensors 108, data networks 110, servers 112, and digitizing tablets 114, are depicted in FIG. 1, one of skill in the art would may recognize, in light of this disclosure, that any number of information handling devices 102, light-sensing apparatuses 104, digital pens 106, light sensors 108, data networks 110, servers 112, and digitizing tablets 114, may be included in the system 100.

In one embodiment, the system 100 includes one or more information handling devices 102, such as for example laptops, tablets, smartphones, workstations, and so forth. In various embodiments, the information handling device 102 includes a processor, and a memory that stores code executable by the processor. In one embodiment, the processor determines whether the digital pen 106 which is configured to communicate with the information handling device 102 is in a docked position. In the embodiment, the processor is configured to receive a light measurement sensed by the digital pen 106 and to perform an adjustment to a light output parameter of the information handling device 102 in response to receiving the light measurement.

In some embodiments the information handling device 102 includes a processor (e.g., a central processing unit ("CPU"), a processor core, a field-programmable gate array ("FPGA") or other programmable logic, an application-specific integrated circuit ("ASIC"), a controller, a microcontroller, and/or another semiconductor integrated circuit device), a volatile memory, and/or a non-volatile storage medium, and/or the like.

In various embodiments, an information handling device 102 includes a display. In certain embodiments, optimum display settings may depend on the ambient light present. For example, if ambient light is low, e.g., in a darkened place such as a theater, and/or a passenger seat in a vehicle at night, a display that is brighter than needed may be disruptive. Thus, it may be beneficial to decrease display brightness in low ambient light.

In one embodiment, the system 100 includes a light-sensing apparatus 104. In some embodiments, the light-sensing apparatus 104 is implemented in the information handling device 102 either as a software program that runs on a processor of the information handling device 102, as a hardware/firmware implementation, and or, a combination of hardware and software. The light-sensing apparatus 104 is described in more detail below with respect to FIG. 2.

In certain embodiments, the system 100 includes one or more digital pens 106

In some embodiments, optimal display settings of an information handling device 102 may depend on the amount of ambient light present. For example, if ambient light is low, dimming the display may be beneficial as a bright display may cause eye strain. If the ambient light is high, it may be beneficial to increase display brightness to enhance a user's ability to read the display. Additional if ambient light is low, e.g., in a darkened place such as a theater, or in a passenger seat in a vehicle at night, a display that is brighter than needed may be disruptive to other persons in the vicinity. However, some existing information handling devices 102 includes only a simple light sensor with only limited ability, such as to detect lightness or darkness above a particular threshold and thus are unable to provide continuous or varying degrees of adjustment in response to continuous or varying degrees of change in the ambient light.

On the other hand, many smartphones, and tablets include built-in cameras that have high-resolution and use significant amounts of power to make them less than optimal for sensing ambient light on a continuous or regular basis. Therefore, including the light sensor as part of the digital pen 106 enhances the functionality of the digital pen 106 and of the information handling device 102.

Accordingly, the system 100 may beneficially improve information handling device technology by providing a cost-effective technology to decrease brightness in low ambient light even for information handling devices 102 that do not include a built-in camera or a built-in light sensor.

Furthermore, in certain embodiments, in response to detecting a low level of ambient light, the system 100 may beneficially increase the brightness of a keyboard backlight of an information handling device 102 that includes both a keyboard and a digital pen interface. This is especially helpful when the digital pen is docked i.e., stored in a slot, cavity, sleeve, or other holder or pen retention device.

The system 100 may further improve information handling device technology by enabling a digital pen to increase or decrease the brightness of a display, keyboard backlight, etc. The direction (increase or decrease) of brightness adjustments to the light output of information handling device depend, in various embodiments on the component or portion of the information handling device being adjusted. For example, in response to detecting bright light in, for example, an outdoor daytime setting, the system 100 may make a brightness adjustment by turning off the keyboard light and increasing the brightness of the display.

In various embodiments, a color temperature of ambient light for an information handling device 102 may affect the readability of information on the display. For example, in response to detecting a "warmer" ambient light, such as for example, in a room eliminated by a typical incandescent bulb, the system 100 may the color of the display should also be redder so that "materials" on the screen can be seen to react correctly to the ambient light. It may be noted that the term "measuring light" may refer to measuring, adjusting, sensing, detecting or performing other functions related to life such as measuring or detecting emitted light, reflected light, hue, saturation, intensity, various wavelengths of light including infrared and/or ultraviolet light, and so forth. Other advantages and improvements provided to the system 100 by including a digital pen for measuring light are described in more detail below.

In certain embodiments, the system 100 includes a data network 110 and the information handling devices 102 are communicatively coupled to one or more other information handling devices 102 and/or to one or more servers 112 over the data network 110, described below. The information handling devices 102, in a further embodiment, may include processors, processor cores, and/or the like that are configured to execute various programs, program code, applications, instructions, functions, and/or the like. For example, in some embodiments, the information handling devices 102 use the data network 110 to download application-specific digital pen software or to update digital pen data such as light sensor color calibration, and/or digital pen profiles for later use.

The data network 110, in one embodiment, includes a digital communication network that transmits digital communications. The data network 110 may include a wireless network, such as a wireless cellular network, a local wireless network, such as a Wi-Fi network, an ad hoc network, and/or the like. The data network 110 may include a wide area network ("WAN"), a local area network ("LAN"), an optical fiber network, the internet, or other digital communications network. The data network 110 may include two or more networks. The data network 110 may include one or more servers, routers, switches, and/or other networking equipment. The data network 110 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. All standards and/or connection types include the latest version and revision of the standard and/or connection type as of the filing date of this application.

The one or more servers 112, in one embodiment, may be embodied as blade servers, mainframe servers, tower servers, rack servers, and/or the like. The one or more servers 112 may be configured as mail servers, web servers, application servers, FTP servers, media servers, data servers, web servers, file servers, virtual servers, and/or the like. The one or more servers 112 may be communicatively coupled (e.g., networked) over a data network 110 to one or more information handling devices 102. The servers 112 may comprise back-end servers for facilitating machine translation of text/speech, analysis of machine-translated text using artificial intelligence, marking-up a copy of the machine-translated text, and/or the like.

Figure 2:
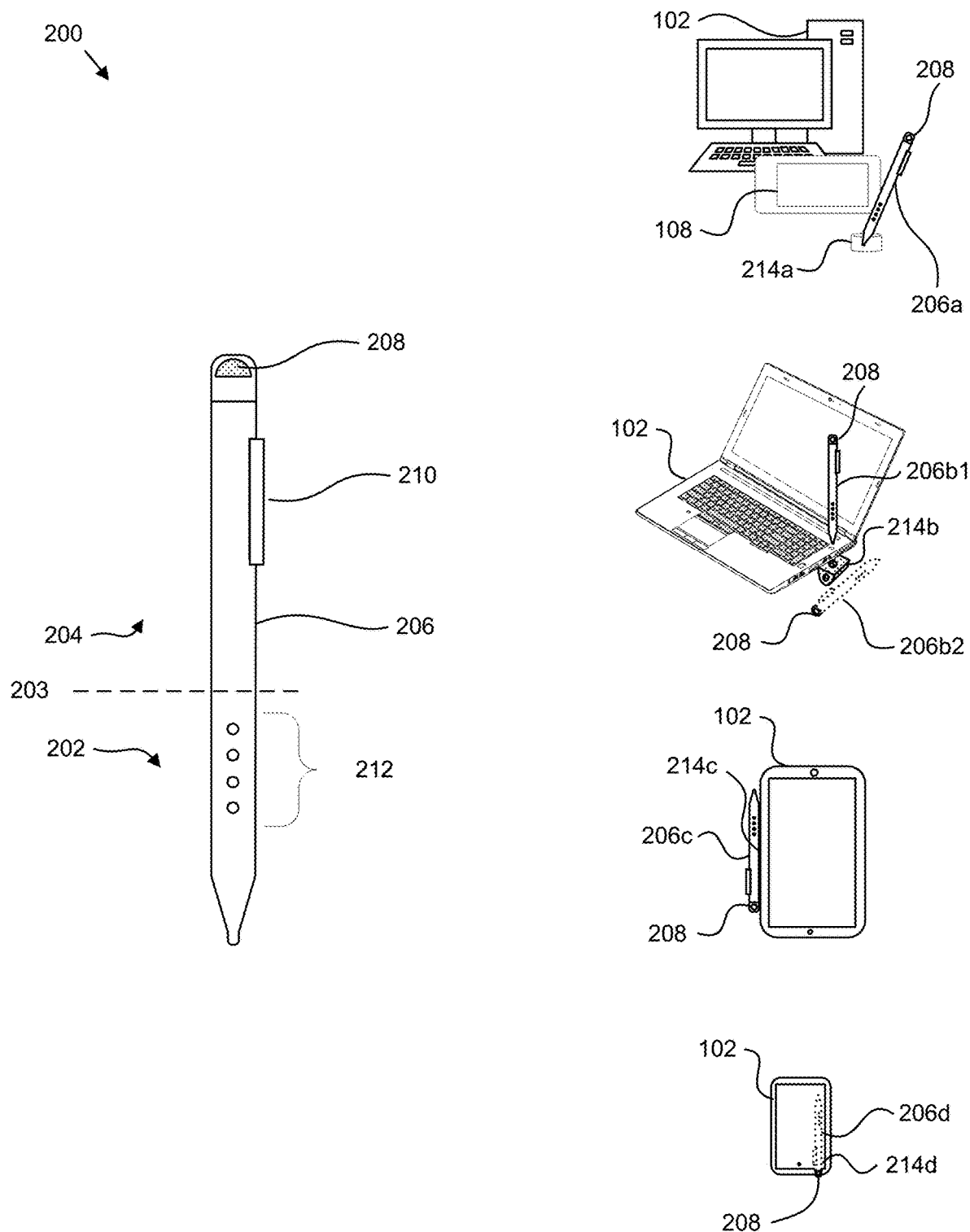
FIG. 2 is a drawing illustrating one embodiment of a digital pen for measuring light for use with an information handling device.

FIG. 2 is a drawing illustrating one embodiment of apparatus 200 including a digital pen 206 for measuring light for use with an information handling device 102. As used herein, the term "digital pen" may refer to any handheld writing instrument for inputting data to a touchscreen, digitizing tablet, and so forth, such as for example, an electronic pen, a stylus, a digitizing pen, an active pen, a smart pen, and the like.

In one embodiment, the digital pen 206 has a pointed tip portion 202 configured to perform one or more of a first group of functions for interacting with the digitizing surface (e.g., a display) of an information handling device 102 or with a peripheral such as the digitizing tablet 114 for connection to the information handling device 102.

In various embodiments, the digital pen 206 also has a blunt end portion 204 opposite the pointed tip portion 202 which is configured to perform one or more functions of a second group of functions for interacting with the display of the information handling device 102. In some embodiments, the digital pen 206 is electrically conductive or has a predetermined capacitive inductance so as to electrically resemble a fine-tipped finger to provide inputs to a display such as a touchscreen display.

In other embodiments, the digital pen 206 includes a battery and one or more buttons that communicate various functions for the information handling device 102 that are communicated via button presses. In some embodiments, the digital pen 206 can communicate pressure information sensed by the pointed tip portion 202 with considerable precision as to the position of the pointed tip relative to an x-y coordinate or pixel of the display.

In certain embodiments, the digital pen 206 includes a light sensor 208 disposed at the blunt end portion 204. In various embodiments, the light sensor 208 may include various light-sensing elements such as photodiodes, phototransistors, or the like, that are configured to sense various color wavelengths. For example, the light sensor 208 may include light-sensing elements for detecting red, green, blue, and white wavelengths of ambient light. Thus, the light sensor 208 may be configured in various embodiments to detect both the brightness and or various types of color information such as the color temperature of ambient light and/or of light emitted and/or reflected from a particular source or surface. In various embodiments, an ambient light measurement made using the light sensor 208 includes at least one measurement selected from a brightness measurement and a color measurement.

It may be noted that the term "blunt end portion" may refer to a portion of the digital pen that is not near the pointed tip portion 202 or is not likely to be covered up by the user's hand holding the digital pen in a typical pen-holding position. In certain embodiments, a dividing line 203 between the blunt end portion 204 and the pointed tip portion 202 may be disposed at any position along the length of the digital pen 206 depending on the desired design and/or application of the digital pen 206. In other words, the length of the blunt end portion 204 and the pointed tip portion 202 may be equal in some embodiments and may be unequal in other embodiments.

In some embodiments, the light sensor 208 may be disposed at the pointed tip portion of the digital pen 206 and/or more than one light sensor 208 may be disposed at more than one position of the digital pen 206 relative to the pointed tip portion 202 and/or the blunt end portion 204. In certain embodiments, the light sensor 208 may one or more lenses, reflectors, diffusers, or other optical elements for detecting ambient light and/or focused light from a selected direction. Examples of detecting ambient light and/or focused light are described in more detail below with respect to FIGS. 4 and 5.

In certain embodiments, the information handling device 102 includes a dock 214 for the digital pen 206. For example, in one embodiment, the dock 214 may include a freestanding holder type dock 214a configured to hold the digital pen 206a in an upright position relative to a surface upon which the dock 214a rests. In other embodiments, such as for example, the dock 214b a slot or a compartment within a portion of the information handling device 102, or the dock 214c e.g., an elastic sleeve, a magnetic fastening mechanism, a hook and loop fastener, or similar place and/or mechanism for holding and/or storing the digital pen 206, while a user is not actively writing, drawing, erasing, and/or performing other interactive digitizing functions using the digital pen 206. In various embodiments, the light sensor 208 may be configured to perform at least one light measurement such as an ambient light measurement and/or a focused light measurement based at least in part on whether the digital pen 206 is in a docked position relative to the information handling device 102.

In various embodiments, the light sensor 208 may be oriented axially away from the pointed tip portion or radially away from the center axis of the digital pen 206 so as to point towards an ambient light source in a docked position. For example, if the digital pen 206b2 is in the same plane as the keyboard, the light sensor may be oriented perpendicularly upward away from the keyboard or a diffusing lens may gather light from multiple directions. In some embodiments, the light sensor 208 is oriented to sense ambient light irrespective of whether a lid of the information handling device is close, e.g., to adjust brightness and/or of an external display when a laptop is running in a docking station. In certain embodiments, in the docked position, the digital pen 206 is configured to be disposed in a predetermined orientation for sensing ambient light. In various embodiments, the predetermined orientation may be in any direction such that the light sensor 208 detects ambient light e.g., the light sensor 208 is not blocked by a portion of the information handling device 102, by the dock 214, or by a portion of user's hand. For example, if the dock 214 is configured to retain the digital pen 206 in an upright position, the light sensor 208 may be oriented axially in a direction away from the pointed tip portion 202 of the digital pen 206.

In another embodiment, a dock 214b may be repositionable or may pivot so as to adjust an orientation 206b1, 206b2 of the digital pen in the docked position. In certain embodiments, a dock 214c may include one side or surface of the digital pen 206c configured to abut a portion of the information handling device 102 so as to fit and/or attach to the surface e.g. by means of a magnetic or another type of fastener. In some embodiments, a dock 214d may be a compartment or sleeve into which the digital pen 206d slides or is inserted so that the light sensor 208 may detect ambient light including brightness and/or color measurements.

By including the light sensor 208 in the digital pen 106, 206, various advantages and improvements may be provided. For example, an information handling device 102 that does not include a light sensor (the senses ambient light brightness, color temperature, etc.) may be retrofitted to have light measurement capabilities that allow adjustments in brightness and/or color temperature to be made to the display and/or keyboard backlighting of the information handling device 102. Furthermore, as new light sensors 208 with greater measurement precision are developed, they may be included with new digital pens to provide upgraded light measurement performance for an information handling device 102 at a lower cost than similar light sensors that are integrated into the information handling device 102.

Moreover, the light sensor 208 in the digital pen 106, 206, in certain embodiments, may use the light measurement made by the light sensor 208 to select a drawing color for the digital pen 106, 206 in response to determining that the digital pen 106, 206 is not in the docked position by pointing the light sensor 208 of the digital pen 206 at a particular surface or material, including both light-emitting services or materials such as a portion of the display, a light-reflecting surface or material, and/or a light filtering service or material. Such color selection capabilities substantially improve the information handling device 102 by significantly enhancing the color selection capabilities beyond those typically available using a color selection element linked to a cursor or fingertip position (e.g., sometimes depicted with an 'eyedropper' icon).

In some embodiments, the light sensor 208 may include sensing elements for sensing infrared ("IR") and/or ultraviolet ("UV") light. In certain embodiments, the light sensor 208 may include light emitted elements such as an IR light-emitting diode. For example, the digital pen 206 may include a light-emitting diode that is configured to emit IR light and one or more IR sensing photodetectors configured to determine a proximity and/or an orientation of the digital pen 206 relative to a surface that reflects the IR light. In various embodiments, IR sensing elements may be used to facilitate the orientation of the light sensor to sense ambient light.

In various embodiments, the digital pen 206 includes one or more sensors and/or circuits to determine whether the pen is in the docked position. For example, a dock 214a may cause a magnet sensor, a switch, a circuit, and/or a sensor, in the digital pen 206a to indicate that the pen is in the docked position. In other embodiments, the magnetic sensor, switch, circuit, or another sensor may be disposed in the dock 214, which in certain embodiments may be included in a portion of the information handling device 102.

Figure 3:
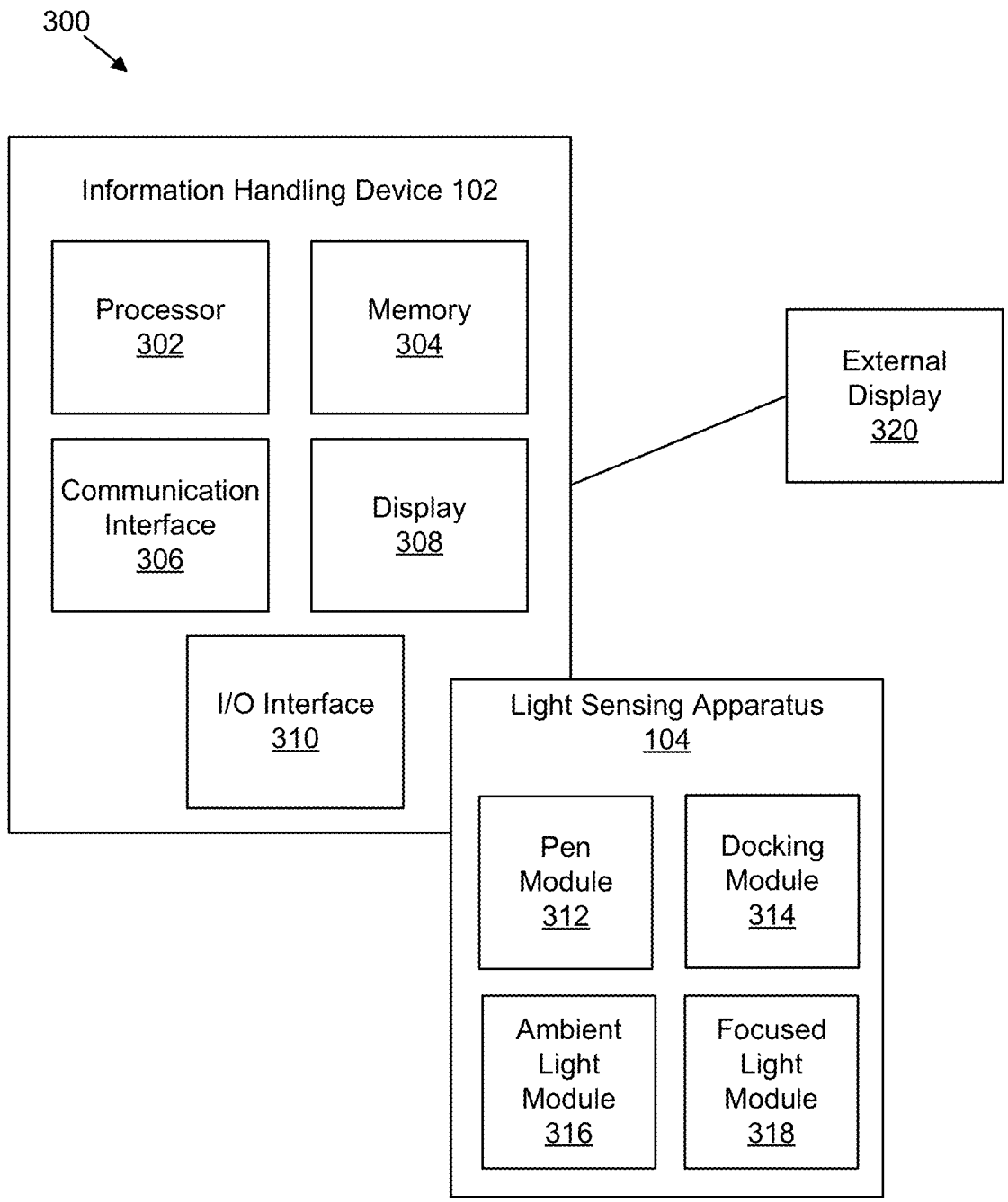
FIG. 3 is a perspective drawing illustrating one embodiment of an apparatus for measuring light using a digital pen.

FIG. 3 is a schematic block diagram illustrating one embodiment of an apparatus 300 that includes an instance of an information handling device 102 with a light-sensing apparatus 104. In one embodiment, the information handling device 102 includes a processor 302, a memory 304, a communication interface 306, a display 308, and an I/O interface 310. The memory 304 may include a semiconductor storage device, a hard disk drive, an optical storage device, a micromechanical storage device, or combinations thereof. The memory 304 may store code. The processor 302 may execute the code. The communication interface 306 may communicate with other devices. The display 308 may display color output. The apparatus 300 may include an external display 320 configured to display output from the information handling device 102.

The I/O interface 310 may communicate with accessories, peripheral devices, input devices, output devices, and so forth. For example, in some embodiments, information handling devices 102 such as laptops, tablets, smartphones, etc., use the I/O interface 310 to communicate with a digital pen such as the digital pen 106, 206 depicted in FIG. 1. In certain embodiments, the I/O interface 310 may support various industry standards such as for example universal serial bus ("USB"), universal stylus initiative ("USI"), Bluetooth, and so forth, there may be used to communicate with a digital pen 106, 206 and/or with other devices, peripherals, accessories, etc.

In various embodiments, the apparatus 300 includes a light-sensing apparatus 104 for the information handling device 102. In one embodiment, the light-sensing apparatus 104 includes a pen module 312, a docking module 314, and ambient light module 316 and a focused light module 318. In one embodiment, the light-sensing apparatus 104 determines whether the digital pen 106, 206 that is configured to communicate with an information handling device 102 is in a docked position. In the embodiment, the light-sensing apparatus 104 receives a light measurement sensed by the digital pen 106, 206 and performs an adjustment to an output parameter of a display 308, 320 for the information handling device 102 in response to receiving the light measurement.

In some embodiments, the pen module 312 communicates with the digital pen 106 to implement functions such as various drawing, sketching, capturing, and position detecting functions as well as functions related to the light sensor of the digital pen 106, 206. For example, in certain embodiments, a first group of functions is related to the pointed tip portion 202 of the digital pen 106, 206 and a second group of functions is related to the blunt end portion 204 of the digital pen 106, 206.

The pen module 312 in various embodiments, may use the I/O interface 310 and/or the communication interface 306 to communicate with the digital pen 106. In certain embodiments, the communication interface 306 and/or the I/O interface 310 communicate with digital pen via a wireless connection such as Bluetooth, Wi-Fi, near field communication ("NFC"), or the like. In some embodiments, the communication interface 306 and/or the I/O interface 310 may communicate with the digital pen 106, 206 via a wired connection. In certain embodiments, at least a portion of the pen module 312 may be implemented as software that runs on the processor 302.

In some embodiments, the pen module 312 may be implemented as a combination of hardware and software. In some embodiments, the pen module 312 may determine whether the digital pen 106 is in an ambient light-sensing mode or a color selection mode. In some modes, the pen module 312 may determine the mode based on whether or not the digital pen 106, 206 is in the docked position. In other embodiments, the ambient light-sensing mode, the color selection mode, and or other modes may be determined independently of whether the digital pen 106, 206 is in the docked position. In various embodiments, the pen module 312 reads one or more buttons 212 to determine the light-sensing mode of the digital pen 106, 206. In certain embodiments, the light-sensing mode of the digital pen 106, 206 is software selected.

In certain embodiments, the light-sensing apparatus 104 includes a docking module 314 that determines whether the digital pen 106, 206 is in a docked position. In various embodiments, the docking module 314 uses one or more sensors, switches, proximity measurements, and so forth, to determine whether the digital pen 106, 206 is in a docked position.

In various embodiments, the light-sensing apparatus 104 includes an ambient light module 316 which the processor 302 causes the information handling device 102 to perform certain functions in response to an ambient light measurement made by the light sensor 208, of the digital pen 106. For example, in one embodiment, the processor 302 is configured to use the light measurement as an ambient light measurement in response to determining that the digital pen 106, 206 is in the docked position. In some embodiments, the ambient light measurement includes at least one measurement selected from a brightness measurement and a color measurement. In certain embodiments, in response to detecting a change in the brightness measurement of the ambient light measurement, the processor 302 performs a brightness adjustment to at least a portion of the information handling device 102.

For example, as explained above with respect to FIG. 1, the corresponding adjustment may include increasing the brightness of the display in response to detecting an ambient light measurement with increased brightness. In other embodiments, the corresponding adjustment may include increasing the brightness of a keyboard backlight in response to detecting an ambient light measurement with decreased brightness.

In some embodiments, performing the adjustment to the output parameter of the display 308 may include adjusting a color temperature of the display 308 based on the color temperature measurement received from the digital pen 106, 206. For example, a user viewing a color image on a white paper may perceive various colors in the image differently based on the color temperature of ambient light in which the user is viewing the image. An image viewed in the broad spectrum of a standard "daylight" ambient light may be perceived differently than the same image viewed under fluorescent lighting or incandescent lighting. The apparatus 300 may, therefore, use a color temperature measurement of the ambient light measurement to dynamically adjust a color temperature of the image displayed on the display 308 in order to improve the white balancing of the display by taking into account the ambient light color temperature.

In other embodiments, performing the adjustment may include other adjustments to the color temperature the display 308 based on a brightness measurement received from the digital pen 106, 206. For example, adjusting a color temperature of the display 308 to reduce the amount of blue light mode may reduce eye-strain, fatigue, or may enable a "sleep-friendly" mode, sometimes referred to as a "night shift" display mode. Rather than making the adjustment in response to a predetermined time of day, the apparatus 300 may make the adjustment in response to the ambient light measurement.

The above-mentioned adjustments and improvements may thus be implemented on various information handling devices 102 irrespective of whether the information handling devices 102 have a built-in light sensor that capable of making brightness and/or color temperature measurements.

Figure 4:
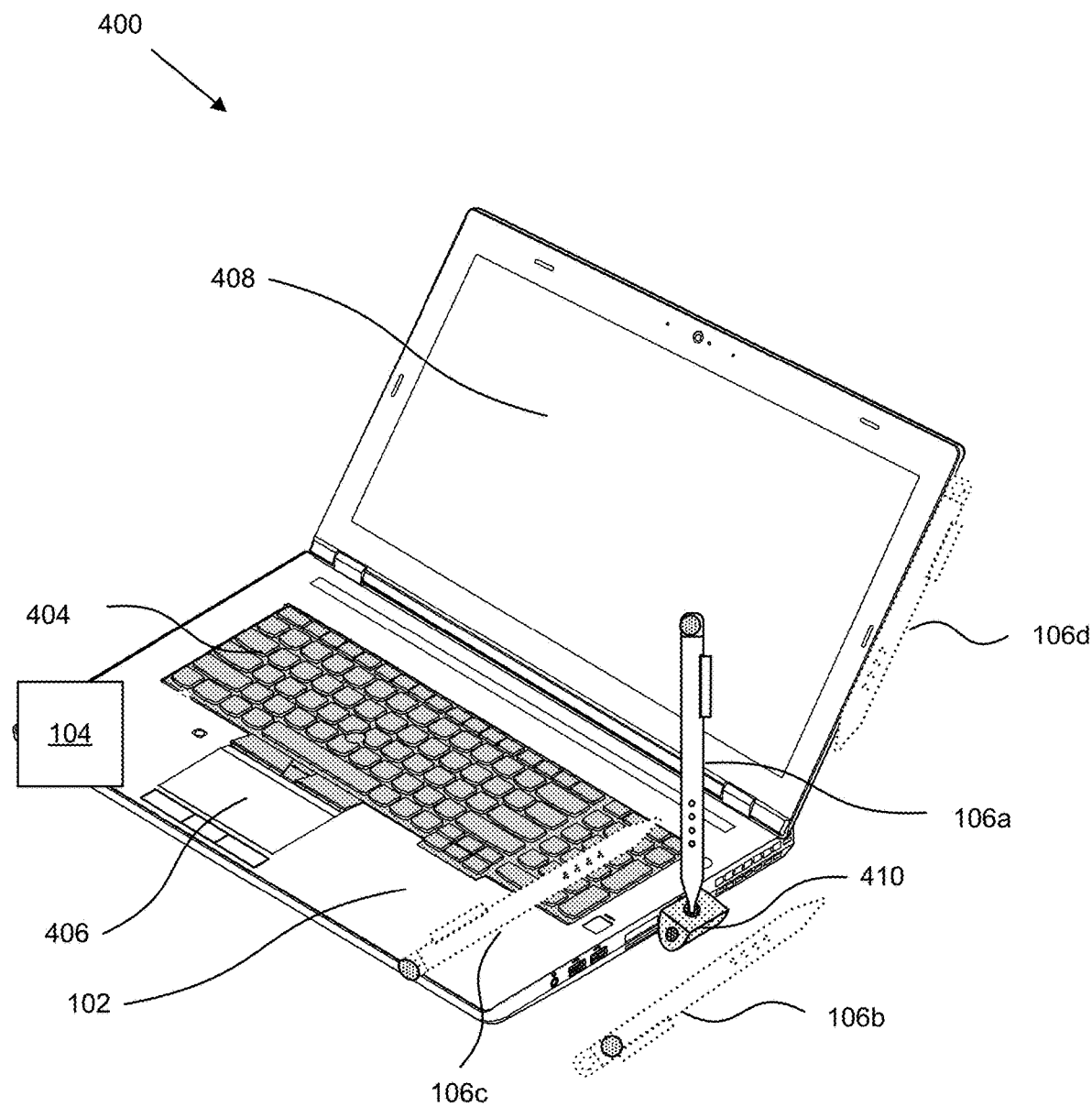
FIG. 4 is a perspective drawing illustrating another embodiment of an apparatus for measuring light using a digital pen.

FIG. 4 is a perspective drawing illustrating one embodiment of an apparatus 400 for measuring light using a digital pen 106. In one embodiment, the apparatus 400 that includes an instance of an information handling device 102 such as a laptop. The apparatus 400 includes an embodiment of a light-sensing apparatus 104 that may be implemented as described above with respect to FIG. 3. The information handling device 102 of the apparatus 400 may include one or more user input interfaces such as a keyboard 404 and/or an input pad 406. The input pad 406 may, in certain embodiments, included a digitizing surface, e.g., a surface upon which the digital pen 106a, 106b, 106c and/or 106d may be used.

In some embodiments, the display 408 may include a digitizing surface for receiving input from the digital pen 106a, 106b, 106c and/or 106d. FIG. 4 depicts various alternative orientations of the digital pen 106a, 106b, 106c, and/or 106d depending on the type of dock 410 used for docking the digital pen 106a, 106b, 106c, and/or 106d.

In various embodiments, a light sensor 108 is disposed at the blunt end portion of the digital pen 106a, 106b, 106c, and/or 106d. The location and/or the orientation of the light sensor 108 may be configured to sense ambient light in response to being in a docking position. One embodiment is illustrated by the upright position of digital pen 106a in which the pointed tip portion is inserted into an upper surface hole of the dock 410. The dock 410 may be removably retained by a tab the fits into a port of the information handling device 102 such as for example a USB port.

In another embodiment, the digital pen 106b is inserted through a horizontal sleeve formed in the dock 410. In a further embodiment, the digital pen 106c is inserted into a dock 410 that includes a compartment or sleeve in a body portion of the information handling device 102 e.g., below the keyboard inside the laptop body. In some embodiments, the digital pen 106d is inserted into a dock that includes a compartment or sleeve in a display portion of the information handling device 102. In each of the above examples, the light sensor 108 is configured to be disposed in a predetermined position (e.g., outward-facing relative to the body of the information handling device 102) for sensing ambient light. In each depicted embodiment of digital pen 106a, 106b, 106c, and/or 106d, the light sensor is disposed and oriented so as to be configured to sense ambient light.

In certain embodiments, the apparatus 400 performs an ambient light measurement made by the light sensor 108 of the digital pen 106a, 106b, 106c, and/or 106d that includes a brightness measurement, a color temperature measurement, or both. The apparatus 400, in various embodiments, perform an adjustment to an output parameter of a display 408 for the information handling device 102 in response to receiving the light measurement.

Figure 5:
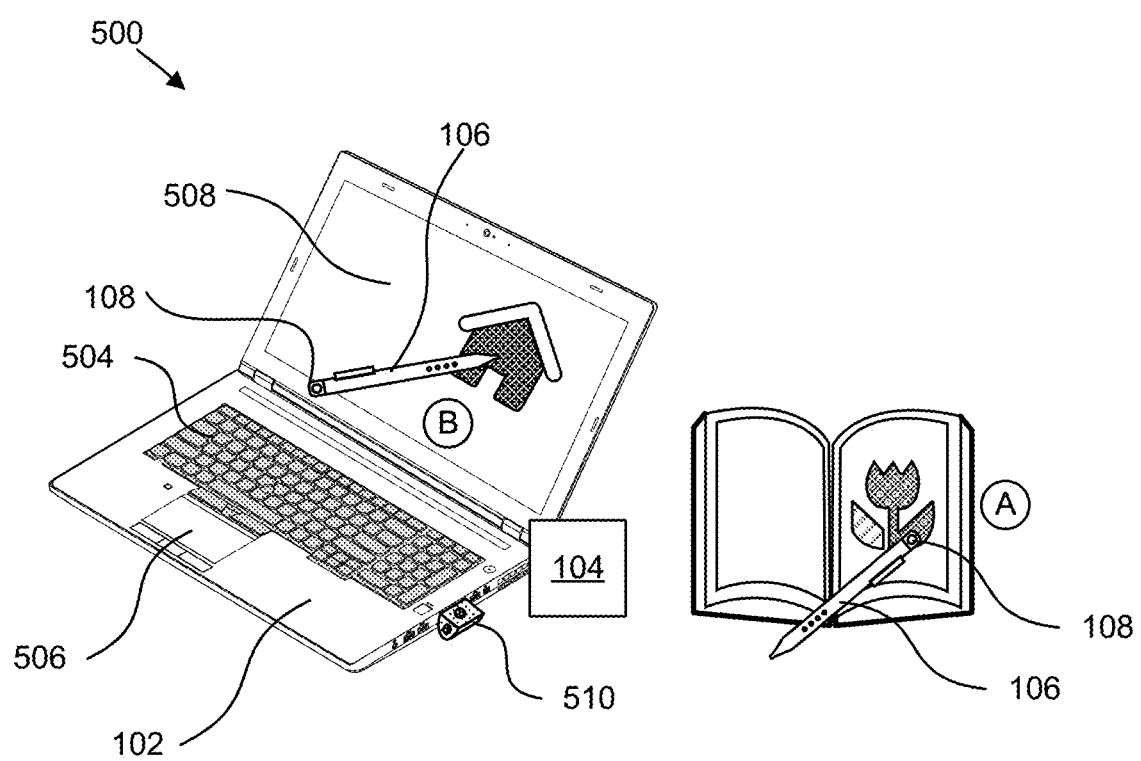
FIG. 5 is a perspective drawing illustrating a further embodiment of an apparatus for measuring light using a digital pen.

FIG. 5 is a perspective drawing illustrating a further embodiment of an apparatus 500 for measuring light using a digital pen 106. The apparatus 500 include an instance of an information handling device 102 having a keyboard 504, a touchpad 506, a display 508, and a dock 510, which in certain embodiments, is substantially similar to the keyboard 404, input pad 406, display 408, and dock 410 of the apparatus 400 described above with respect to FIG. 4.

In one embodiment, the apparatus 500 includes a light-sensing apparatus 104 that determines that the digital pen 106 which is configured to communicate with an information handling device 102 is not in a docked position, i.e., is being used by a user. In some embodiments, the apparatus 500 receives a light measurement sensed by the digital pen 106 and uses the light measurement to select a drawing color for the digital pen 106 in response to determining that the digital pen 106 is not in the docked position and is configured to be in a color selection mode.

In certain embodiments, a user points the light sensor 108 of the digital pen 106 towards a portion of the display 508 and a color measurement made by the light sensor 108 is used to select a drawing color for the digital pen 106. For example, in response to the light sensor 108 making a focused light measurement on a portion of the display 508 that is displaying a red-brown color, the red-brown color is selected as the drawing color of the digital pen 106.

In other embodiments, the apparatus 500 uses the light measurement to select a drawing color for the digital pen 106 in response to determining that the digital pen 106 is not in the docked position and determining that the digital pen 106 is configured to be in a color selection mode. For example, in response to light sensor 108 of the digital pen 106 at point 'A' making a color measurement of a particular green color on a printed image of a flower leaf, the apparatus 500 selects the particular green color as a drawing color for the digital pen 106 which can then be used to color the image of the house at point 'B.' Thus, the apparatus 500 provides substantial improvements and advantages over color selection mechanisms such as cursor-based color selection that works only for selecting colors displayed on the display 508.

Figure 6:
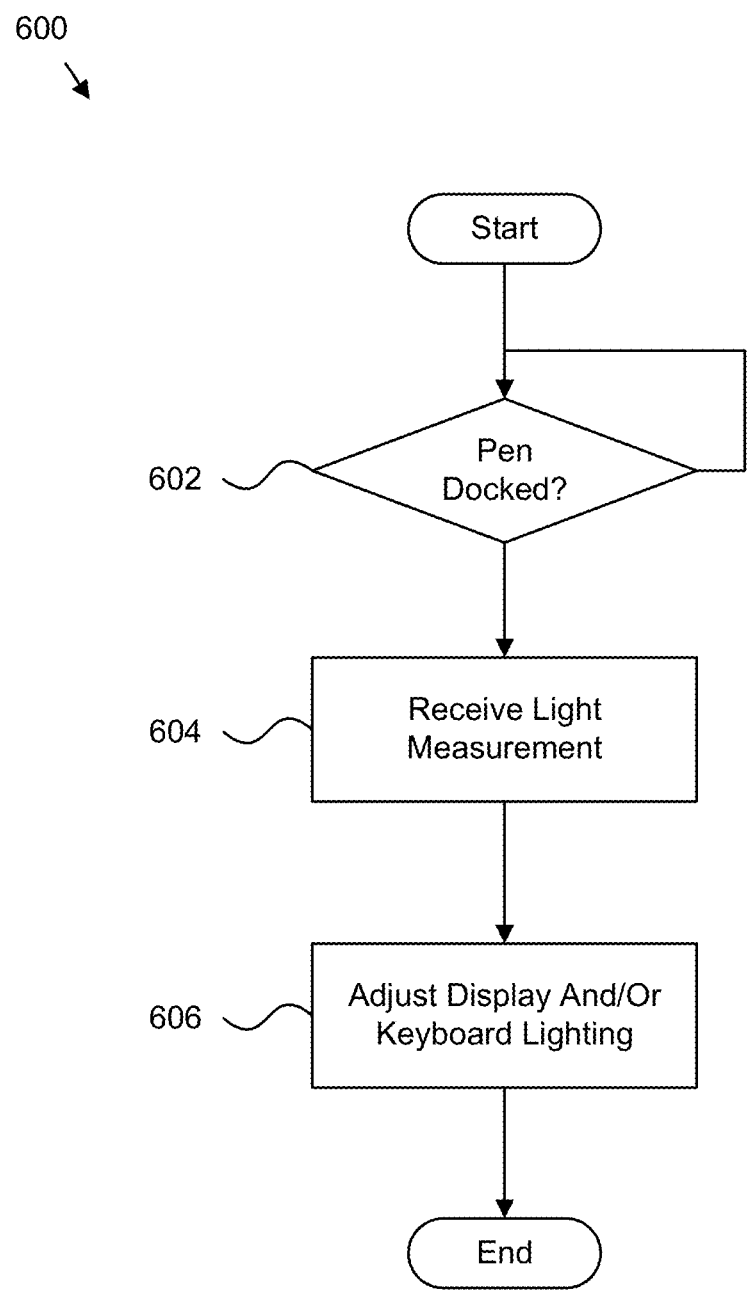
FIG. 6 is a schematic flow chart diagram illustrating one embodiment of a method for measuring light using a digital pen.

FIG. 6 is a schematic flow chart diagram illustrating an embodiment of a method 600 for measuring light using a digital pen. In one embodiment, the method 600 begins and determines 602 whether a digital pen that is configured to communicate with an information handling device is in a docked position. The method 600 continues and receives 604 a light measurement sensed by the digital pen and performs 606 an adjustment to a light output parameter of the information handling device in response to receiving the light measurement.

For example, in some embodiments, an adjustment to the light output parameter may include an adjustment (e.g., increase or decrease) to the display brightness, an adjustment to the color temperature of the display, an adjustment to the brightness of a keyboard backlight, and/or another adjustment to a portion or a component of the information handling device that outputs light of any color. In various embodiments, the method 600 may be implemented substantially as described above with respect to the function of the system 100, and the apparatuses 200, 300, 400, and 500 depicted respectively in FIGS. 1-5.

Figure 7:
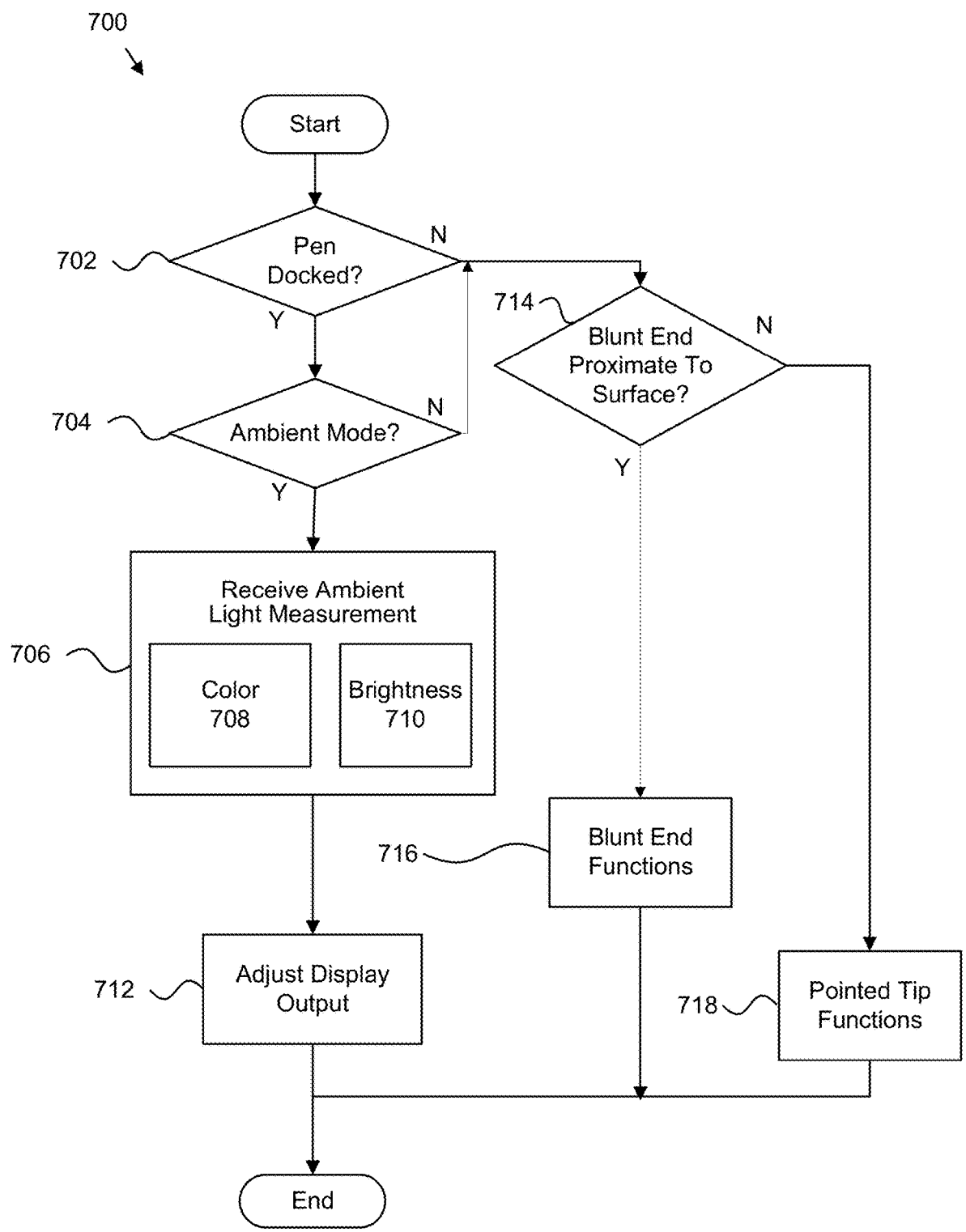
FIG. 7 is a schematic flow chart diagram illustrating another embodiment of a method for measuring light using a digital pen.

FIG. 7 is a schematic flow chart diagram illustrating another embodiment of a method 700 for measuring light using a digital pen. In various embodiments, one or more portions of the method 700 may be skipped or may be performed in a different order than is depicted in FIG. 7. In one embodiment, the method 700 begins and determines 702, by use of a processor, whether a digital pen that is configured to communicate with an information handling device is in a docked position.

In response to the digital pen being docked or garaged, the method 700 continues and receives 704 a light measurement sensed by the digital pen. In some embodiments, the method 700 continues and determines 706 whether the digital pen is in ambient light mode. In response to the digital pen being in ambient light mode, the method 700 uses the light measurement as a color measurement 708 and/or a brightness measurement 710. In various embodiments, the method 700 continues and performs 712 an adjustment to a light output parameter of the information handling device in response to receiving the light measurement and the method 700 ends.

In response to determining 702 that the digital pen is not docked or is not in ambient light mode, the method 700 continues and determines 714 whether a blunt end of the digital pen is proximate (e.g., within a predetermined distance) to a surface such as a touchscreen surface or a surface of an object. If yes, the method 700 continues and performs one or more functions using the blunt end portion of the digital pen such as color selection, erasing, marking, and so forth based at least in part on a light and/or color measurement made using a light sensor of the digital pen and the method 700 ends. In response to determining that the blunt end of the digital pen is not proximate to the surface, the method 700 continues and performs 718 one or more functions using the pointed tip portion of the digital pen. In certain embodiments, the method 700 may be implemented substantially as described above with respect to the function of the system 100, and the apparatuses 200, 300, 400, and 500 depicted respectively in FIGS. 1-5.

Thus, the system 100, the apparatuses 200, 300, 400 and 500, and the methods 600 and 700 may operate according to the various embodiments disclosed herein to improve information handling device technology by adjusting a display parameter such as brightness, color temperature, drawing color, and so forth in response to a light measurement made by a color sensor of the digital pen. These embodiments provide more convenient ways to measure light and/or color and make adjustments to display brightness, color temperature, drawing color selection, and the like. They also provide the benefits of more cost-effective retrofitted light-sensing and/or upgrading of light-sensing than may be achieved using light sensors integrated into the information handling device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
determine whether a digital pen that is configured to communicate with an information handling device is in a docked position;
receive a light measurement sensed by the digital pen;
perform first one or more adjustments to first one or more light output parameters of the information handling device in response to receiving the light measurement and a determination that the digital pen is in a docked position; and
perform second one or more adjustments to second one or more light output parameters of the information handling device in response to receiving the light measurement and a determination that the digital pen is in an undocked position;
wherein the first one or more adjustments are different from the second one or more adjustments, and the first one or more light output parameters are the same as or different from the second one or more light output parameters.

2. The apparatus of claim 1, wherein in the docked position, the digital pen is configured to be disposed in a predetermined orientation for sensing ambient light.

3. The apparatus of claim 1, wherein the processor is configured to use the light measurement as an ambient light measurement in response to determining that the digital pen is in the docked position.

4. The apparatus of claim 3, wherein the ambient light measurement comprises at least one measurement selected from a brightness measurement, a color measurement, and combinations thereof.

5. The apparatus of claim 4, wherein in response to detecting a change in the brightness measurement of the ambient light measurement, the processor performs a brightness adjustment to at least a portion of the information handling device.

6. The apparatus of claim 4, wherein performing the adjustment to the light output parameter of the information handling device comprises adjusting a color temperature of a display for the information handling device based on the color measurement received from the digital pen.

7. The apparatus of claim 6, wherein in response to detecting a change in the color measurement of the ambient light measurement, the processor performs a corresponding adjustment to the color temperature of the display for the information handling device.

8. The apparatus of claim 1, wherein the processor is configured to use the light measurement as an ambient light measurement in response to:
   determining that the digital pen is not in the docked position; and
   determining that the digital pen is configured to be in an ambient light-sensing mode.

9. The apparatus of claim 1, wherein the processor is configured to use the light measurement to select a drawing color for the digital pen in response to:
   determining that the digital pen is not in the docked position; and
   determining that the digital pen is configured to be in a color selection mode.

10. The apparatus of claim 9, wherein the drawing color selected is a color emitted by a portion of a display for the information handling device.

11. The apparatus of claim 9, wherein the drawing color selected is a reflected color sensed by the digital pen from an object in ambient light.

12. A method comprising:
   determining whether a digital pen that is configured to communicate with an information handling device is in a docked position;
   receiving a light measurement sensed by the digital pen; and
   performing first one or more adjustments to a first one or more light output parameters of the information handling device in response to receiving the light measurement and a determination that the digital pen is in a docked position; and
   performing second one or more adjustments to second one or more light output parameters of the information handling device in response to receiving the light measurement and a determination that the digital pen is in an undocked position;
   wherein the first one or more adjustments are different from the second one or more adjustments, and the first one or more light output parameters are the same as or different from the second one or more light output parameters.

13. The method of claim 12, further comprising using the light measurement as an ambient light measurement that includes at least one measurement selected from a brightness measurement, a color measurement, and combinations thereof, in response to determining that the digital pen is in the docked position.

14. The method of claim 13, further comprising, in response to detecting a change in the brightness measurement of the ambient light measurement, performing a brightness adjustment selected from a display adjustment, a keyboard backlight adjustment, and combinations thereof.

15. The method of claim 13, wherein performing the adjustment to the light output parameter of the information handling device comprises adjusting a color temperature of a display for the information handling device based on the color measurement received from the digital pen.

16. The method of claim 15, further comprising, in response to detecting a change in the color measurement of the ambient light measurement, performing a corresponding adjustment to a color temperature of the display for the information handling device.

17. The method of claim 12, comprising using the light measurement to select a drawing color for the digital pen in response to:
   determining that the digital pen is not in the docked position; and
   determining that the digital pen is configured to be in a color selection mode.

18. An apparatus comprising:
   a digital pen configured to be in data communication with an information handling device whether in a docked position or an undocked position, the digital pen having:
      a pointed tip portion configured to perform one or more functions of a first group of functions for interacting in the undocked position with a digitizing surface of the information handling device; and
      a blunt end portion opposite the pointed tip portion and configured to perform one or more functions of a second group of functions for interacting in the undocked position with the digitizing surface of the information handling device; and
      a light sensor disposed at the blunt end portion and configured to perform at least one light measurement selected from an ambient light measurement in either the docked or undocked position, a focused light measurement in the undocked position, and combinations thereof, and to communicate to the information handling device whether the digital pen is in the docked position or the undocked position relative to the information handling device.

19. The apparatus of claim 18, wherein the digital pen is configured to perform the one or more functions of the second group using the light sensor disposed at the blunt end portion.

20. The apparatus of claim 19, wherein:
   the first group of functions comprises narrow width drawing functions, pointing functions, object selection functions, command functions and combinations thereof; and
   the second group of functions comprises display brightness adjustment functions, display color temperature adjustment functions, erasing functions, drawing color selection functions, marking functions, and combinations thereof.

* * * * *